(12) United States Patent
Yoshida et al.

(10) Patent No.: US 11,196,684 B2
(45) Date of Patent: Dec. 7, 2021

(54) FLOW CONTROL DEVICE AND METHOD

(71) Applicant: Nippon Telegraph and Telephone Corporation, Tokyo (JP)

(72) Inventors: Syuhei Yoshida, Tokyo (JP); Yuta Ukon, Tokyo (JP); Koji Yamazaki, Tokyo (JP); Koyo Nitta, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 16/963,544

(22) PCT Filed: Feb. 8, 2019

(86) PCT No.: PCT/JP2019/004583
§ 371 (c)(1),
(2) Date: Jul. 21, 2020

(87) PCT Pub. No.: WO2019/159832
PCT Pub. Date: Aug. 22, 2019

(65) Prior Publication Data
US 2021/0051117 A1 Feb. 18, 2021

(30) Foreign Application Priority Data

Feb. 13, 2018 (JP) .............................. JP2018-022898

(51) Int. Cl.
*H04L 12/861* (2013.01)
*H04L 12/851* (2013.01)
*H04L 12/883* (2013.01)

(52) U.S. Cl.
CPC ...... *H04L 49/9057* (2013.01); *H04L 47/2483* (2013.01); *H04L 49/9015* (2013.01); *H04L 49/9063* (2013.01); *H04L 49/9089* (2013.01)

(58) Field of Classification Search
CPC ............. H04L 49/9057; H04L 47/2483; H04L 49/9015; H04L 49/9063; H04L 49/9089
See application file for complete search history.

(56) References Cited

FOREIGN PATENT DOCUMENTS

| JP | 2012209695 A | | 10/2012 |
|---|---|---|---|
| JP | 2013098815 A | * | 5/2013 |
| JP | 2013098815 A | | 5/2013 |
| JP | 2015179970 A | * | 10/2015 |
| JP | 2015179970 A | | 10/2015 |

* cited by examiner

*Primary Examiner* — Siming Liu
(74) *Attorney, Agent, or Firm* — Slater Matsil, LLP

(57) ABSTRACT

A flow control device includes an analysis unit identifying a flow of a received packet, a plurality of queues temporarily storing packets sorted according to each flow, an allocation information storage unit storing allocation information regarding a queue allocated for each flow, a sorting unit deciding a queue to be a storage destination of the received packet and sorts the packet based on a result identified by the analysis unit and the allocation information, a saved packet holding unit saving a packet belonging to a flow determined to have no allocation information regarding the queue to be allocated by the sorting unit, and a transmission unit transmitting the packet temporarily stored in the plurality of queues and the packet saved in the saved packet holding unit to a processing unit that processes a packet.

10 Claims, 26 Drawing Sheets

| PROCESSING UNIT ID | ALLOCATED FLOW ID |
|---|---|
| #0 | A |
| #1 | B |
| #2 | C |
| ⋮ | ⋮ |

Fig. 3

FLOW CONTROL DEVICE AND METHOD

CROSS-REFERENCE TO RELATED APPLICATIONS

This application is a national phase entry of PCT Application No. PCT/JP2019/004583, filed on Feb. 8, 2019, which claims priority to Japanese Application No. 2018-022898 filed on Feb. 13, 2018, which applications are hereby incorporated herein by reference.

TECHNICAL FIELD

The present disclosure relates to a flow control device and method, and particularly to a technique of processing packets in parallel.

BACKGROUND

In general, a data center needs to process requests from a plurality of users using a single server. In the related art, for the purpose of improving the processing performance of data processing devices such as servers, a data processing device includes processing units in parallel to process data such as requests. A data processing device with a configuration of a plurality of processing units arranged in parallel needs to identify a plurality of mixed packet flows and sort packets included in each of the packet flows according to suitable processing units.

For example, PTL 1 discloses a packet sorting device and a method that ensure a packet sequence in the same packet flow (hereinafter referred to as a "flow") and prevent uneven load on the parallel processing units. In the technology of PTL 1, queues are prepared for each of the processing units, and packets are sorted under the following constraints.

First, if packets of the same flow are present in any queue, a new packet of the same flow is sorted into the same queue. Thus, it is possible to ensure that no sequence inversion occurs in packets included in the same flow before and after processing. Second, packets of a new flow are sorted only into an empty queue. Thus, concentration of a long flow on a specific processing unit can be avoided.

CITATION LIST

Patent Literature

PTL 1: Japanese Unexamined Patent Application Publication No. 2012-209695

SUMMARY

Technical Problem

However, when the number of flows is greater than the number of processing units, there is a possibility that packets of a new flow are entered with no empty queue present. In the packet sorting technique described in PTL 1, if a packet of a new flow is input with no empty queue present, the input packet needs to be put on standby until any queue becomes empty. During the standby, the input of subsequent packets from an input buffer is stalled, which leads to a problem of deterioration in use efficiency of the processing units.

In order to solve the problem described above, an object of the present disclosure is to provide a flow control device capable of improving use efficiency of processing units.

Means for Solving the Problem

In order to solve the above-described problem, a flow control device according to the present disclosure includes a reception unit that receives a packet, an analysis unit that identifies a flow of the received packet, a plurality of queues that temporarily store packets sorted according to each flow identified by the analysis unit, an allocation information storage unit that stores allocation information regarding a queue allocated to each of the flows, a sorting unit that decides a queue to be a storage destination of the received packet and sorts the packet based on a result identified by the analysis unit and the allocation information stored in the allocation information storage unit, a saved packet holding unit that saves a packet belonging to a flow determined to have no queue allocated by the sorting unit as a storage destination of the packet, and a transmission unit that transmits the packet temporarily stored in the plurality of queues and the packet saved in the saved packet holding unit to a processing unit that processes a packet.

In addition, the flow control device according to the present disclosure may further include a control unit that determines, in case there is a queue with no packet stored and a packet saved in the saved packet holding unit, a flow of a head packet of the saved packets to be a predetermined flow and allocates the predetermined flow for the queue with no packets stored, where the transmission unit may acquire all packets belonging to the predetermined flow from the saved packet holding unit and transmit the packets to the processing unit, and the sorting unit may sort, out of the packets received by the reception unit, the packets belonging to the predetermined flow into the queue with no packets stored.

In addition, in the flow control device according to the present disclosure, the saved packet holding unit may include an input unit that receives an input of the saved packet, a saving memory that holds the input packet, a pointer storage unit that holds pointer information to manage the saving memory, a memory control unit that controls reading and writing of data from and into the saving memory, and an output unit that outputs the packet held in the saving memory to the transmission unit.

In addition, in the flow control device according to the present disclosure, the saving memory may hold an area in which the packet is stored as a first linked list and hold an empty area as a second linked list.

In addition, in the flow control device according to the present disclosure, the memory control unit may store a packet sequentially from a head node side toward a tail node side of the second linked list held by the saving memory, add a node in which the packet is stored to a tail node of the first linked list and retrieve, in parallel, a packet belonging to a predetermined flow serving as a flow of a head packet of the saved packets sequentially from a head node side toward the tail node side of the first linked list, and add the packet to the tail node of the second linked list.

In addition, in the flow control device according to the present disclosure, the pointer storage unit may store an address of the head node and an address of the tail node of each of the first linked list and the second linked list held by the saving memory and a scanning pointer to be used when the memory control unit retrieves the packet belonging to the predetermined flow.

In addition, a flow control method according to the present disclosure includes a receiving step of receiving a packet, an analyzing step of identifying a flow of the received packet, a sorting step of deciding, among a plurality of queues temporarily storing packets sorted according to each flow identified in the analyzing step, a queue to be a storage destination of the received packet and sorting the packet based on a result identified in the analyzing step and allocation information regarding a queue allocated to each of the flows stored in an allocation information storage unit, a queue storing step of storing the packet sorted in the sorting step in the queue, a packet saving step of saving a packet belonging to a flow determined to have no queue allocated as a storage destination of the packet in the sorting step in a saved packet holding unit, and a transmitting step of transmitting the packet temporarily stored in the plurality of queues and the packet saved in the saved packet holding unit to a processing unit that processes a packet.

In addition, the flow control method according to the present disclosure may further include a flow allocating step of deciding, in case there is a queue with no packet stored and a packet saved in the saved packet holding unit, a flow of a head packet of the saved packets to be a predetermined flow and allocating the predetermined flow for the queue with no packets stored, where, in the transmitting step, all packets belonging to the predetermined flow may be acquired from the saved packet holding unit and transmitted to the processing unit, and, in the sorting step, out of the packet received in the reception step, the packets belonging to the predetermined flow may be sorted into the queue with no packets stored.

Effects of Embodiments of the Invention

According to the present disclosure, in case there is no queue into which a received packet can be sorted, the packet is saved in the saved packet holding unit. In addition, only packets of a predetermined flow are retrieved from packets held in the saved packet holding unit in an input order of the packets and transmitted to the transmission unit, and thus even in a case where a packet belonging to a new flow is input with no empty queue present, it is possible to avoid stalling of the input of subsequent packets, thereby improving use efficiency of the processing units.

BRIEF DESCRIPTION OF THE DRAWINGS

FIG. 3 is an explanatory diagram of a data structure of an allocation information storage unit according to an embodiment of the present disclosure.

DETAILED DESCRIPTION OF ILLUSTRATIVE EMBODIMENTS

Preferred embodiments of the present disclosure will be described in detail below with reference to FIG. 1 to FIG. 19.

Embodiment

Figure 1:
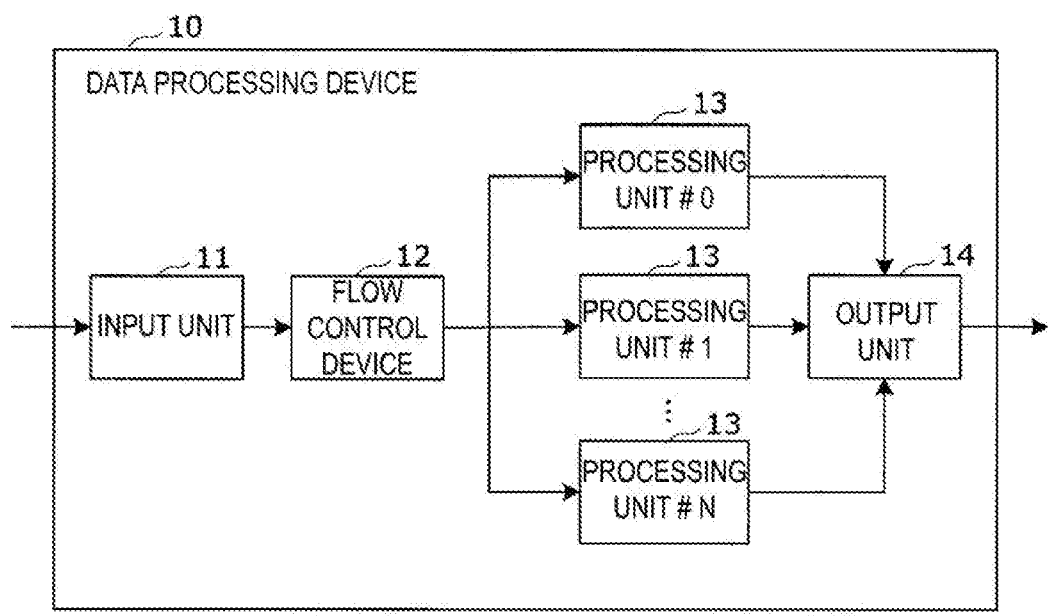
FIG. 1 is a block diagram illustrating a configuration of a data processing device including a flow control device according to an embodiment of the present disclosure.

FIG. 1 is a block diagram illustrating a configuration of a data processing device 10 including a flow control device 12 according to an embodiment of the present disclosure. The data processing device 10 is realized by any of various computers including, for example, a server installed in a data center. The data processing device 10 performs parallel processing of data such as a plurality of requests received from a plurality of user terminals via an external network, which is not illustrated.

The data processing device 10 executes various types of data processing, such as processing of a plurality of requests, using a processor, for example, a CPU, in accordance with a program stored in a storage device, which is not illustrated, provided in the data processing device 10. More specifically, the processor such as a CPU can be embodied as a multi-core processor having multiple cores.

The data processing device 10 includes an input unit 11, a flow control device 12, a plurality of processing units 13, and an output unit 14.

The input unit 11 performs data communication via an external network, which is not illustrated, and receives packets from outside the data processing device 10. The input unit 11 includes a communication control device for connecting the data processing device 10 to various external electronic devices via a communication network. A packet received by the input unit 11 is input to the flow control device 12.

The flow control device 12 identifies a flow of packets input via the input unit 11 and determines a processing unit to serve as a sorting destination in accordance with the flow. The packets of which the flow has been controlled by the flow control device 12 are input to the processing units 13. The flow control device 12 is realized such that a processor such as a CPU executes identification and control of input packets in accordance with a program stored in a storage device such as a ROM, a RAM, and a flash memory, none of which is illustrated. Note that details of the flow control device 12 will be described below.

The processing units 13 are configured by a plurality of processing units 13 arranged in parallel. Each of the processing units 13 is realized by a multi-core processor, for example, a multi-core CPU. The plurality of processing units 13 (a processing unit #0, a processing unit #1, ..., and a processing unit #N; N is an integer greater than or equal to 1) performs parallel processing on the packets.

The output unit 14 outputs the result of the packet processing executed by the processing units 13 to the outside via an external network, which is not illustrated. The output unit 14 includes a communication control device, similarly to the input unit 11 described above.

Configuration of Flow Control Device

Figure 2:
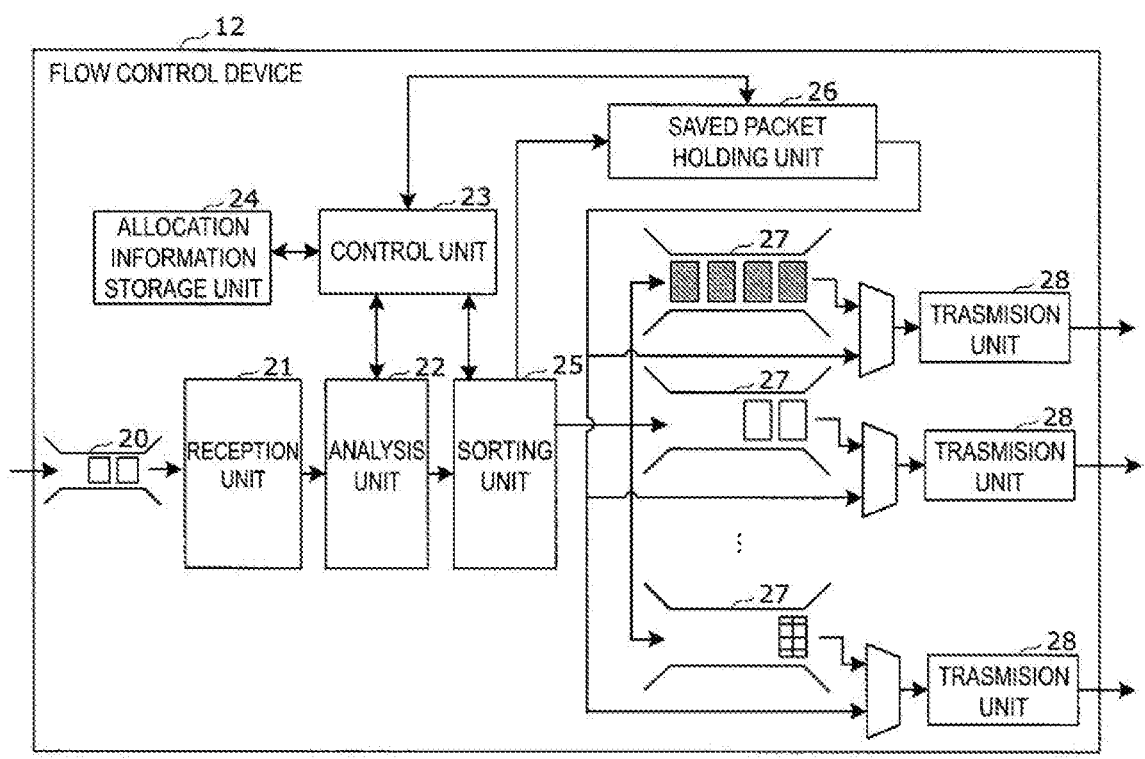
FIG. 2 is a block diagram illustrating a configuration of the flow control device according to an embodiment of the present disclosure.

Next, a configuration of the flow control device 12 will be described using the block diagram illustrated in FIG. 2.

The flow control device 12 includes an input buffer 20, a reception unit 21, an analysis unit 22, a control unit 23, an allocation information storage unit 24, a sorting unit 25, a saved packet holding unit 26, a plurality of queues 27, and a plurality of transmission units 28.

The input buffer 20 holds packets input via the input unit 11.

The reception unit 21 receives the packets held in the input buffer 20.

The analysis unit 22 identifies a flow of the packets received by the reception unit 21. The flow of the packets is, for example, information indicating attributes of the packets regarding a transmission source and a destination of the packets included in header information of the received packets.

The control unit 23 controls each of the functional units such as the analysis unit 22 and the sorting unit 25 included in the flow control device 12. In addition, the control unit 23 performs reading, writing, and the like of information stored in the allocation information storage unit 24.

The allocation information storage unit 24 stores allocation information for a queue 27 allocated to every flow. A data structure of the allocation information storage unit 24 will be described below.

The sorting unit 25 determines and sorts the queue 27 that will serve as a storage destination of a packet received by the reception unit 21 on the basis of information of the flow of the packets identified by the analysis unit 22 and allocation information stored in the allocation information storage unit 24, More specifically, the sorting unit 25 sorts received packets to the queue 27 under certain conditions and, if there is no empty queue 27, causes the received packets to be saved in the saved packet holding unit 26.

The saved packet holding unit 26 saves and stores a packet belonging to the flow that has been determined to have no allocation information regarding the queue 27 to be allocated by the sorting unit 25. Specifically, the saved packet holding unit 26 saves and stores the packet if there is no empty queue 27. In addition, the saved packet holding unit 26 only retrieves packets belonging to a predetermined flow from the held packets in an input order of packets and transmits the packets to the transmission units 28 in the subsequent stage. The saved packet holding unit 26 is connected to all of the transmission units 28.

Each of the queues 27 is a memory that temporarily stores packets sorted to each flow identified by the analysis unit 22. The queues 27 are provided for each of the processing units 13. Each of the queues 27 has a structure in which packets are stored in a first-in first-out manner. In addition, packets stored in each queue 27 are retrieved in the input order and transmitted to the transmission units 28.

The transmission units 28 transmit packets temporarily stored in the queues 27 and packets saved in the saved packet holding unit 26 to the processing units 13. The transmission units 28 are provided for each queue 27, that is, for each processing unit 13.

Data Structure of Allocation Information Storage Unit

Next, a data structure of the allocation information storage unit 24 will be described using FIG. 3. The allocation information storage unit 24 holds a table of allocation information in which association of flows allocated to the queues 27 is described. As illustrated in FIG. 3, the allocation information storage unit 24 stores IDs of the processing units 13 in association with IDs of flows.

Specifically, an ID "#0" of a processing unit 13 associated with an ID "A" of an allocated flow, an ID "#1" of a processing unit associated with an ID "B" of an allocated flow, and an ID "#2" of a processing unit associated with an ID "C" of an allocated flow are stored. Note that, instead of the IDs of the processing units 13, IDs of the corresponding queues 27 may be used.

Operation of Flow Control Device

Figure 4:
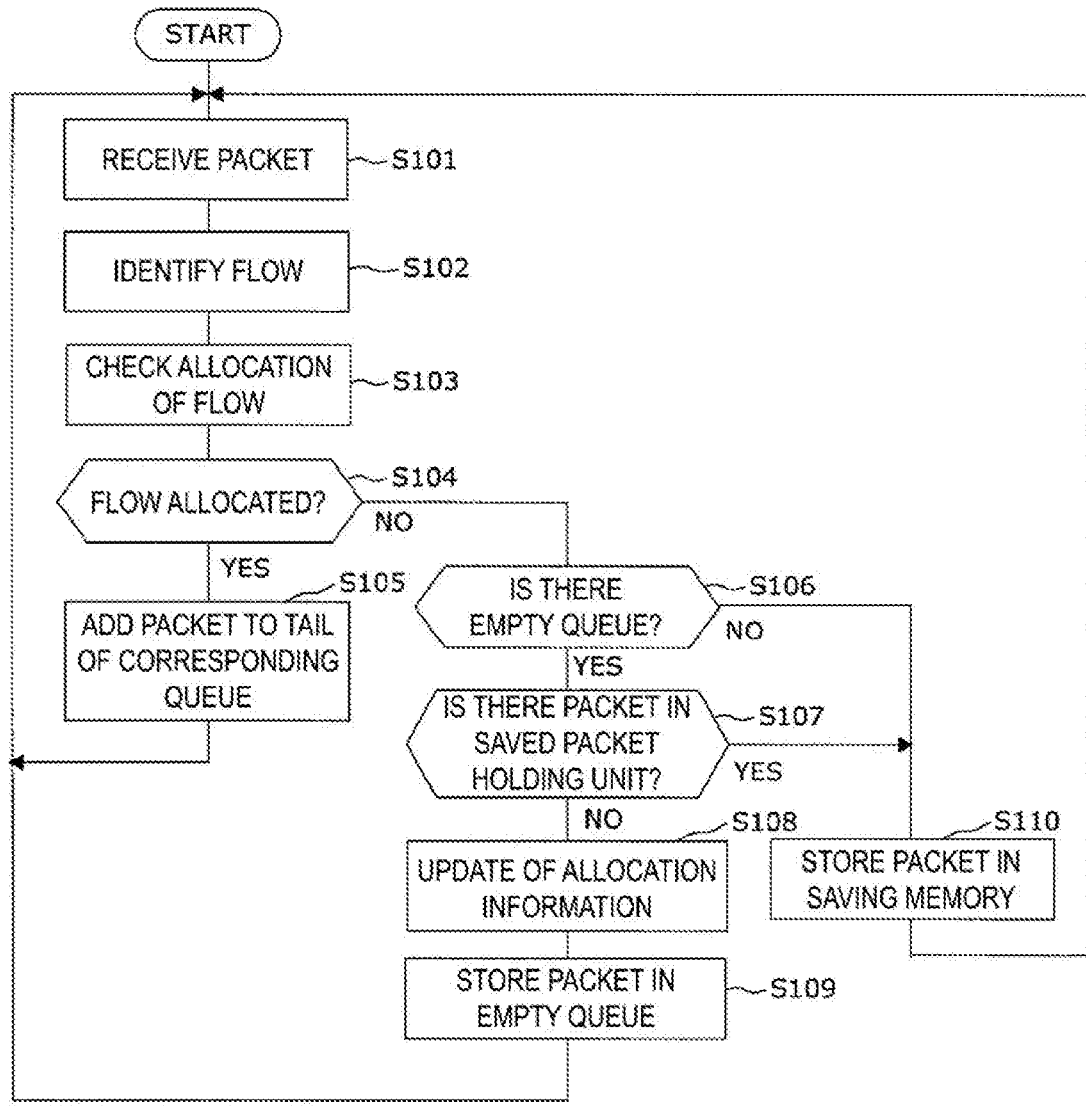
FIG. 4 is a flowchart for describing an operation of a flow control device according to an embodiment of the present disclosure.

Next, an operation of the flow control device 12 will be described using the flowchart of FIG. 4. The flowchart of FIG. 4 illustrates processing performed until the flow control device 12 stores packets input to the input buffer 20 in either the saved packet holding unit 26 or the plurality of queues 27. First, the reception unit 21 receives packets from the input buffer 20 (step S101). Next, the analysis unit 22 identifies the flow of the received packets (step S102). More specifically, the analysis unit 22 identifies the flow on the basis of information included in the header information of the received packets.

Next, the control unit 23 makes a reference to the allocation information table of the allocation information storage unit 24 and checks whether the flow of the received packets identified by the analysis unit 22 has been allocated to any of the processing units 13, that is, any of the queues 27 (step S103). For example, if the ID of the flow of the packets identified by the analysis unit 22 is "A" as illustrated in FIG. 3, the packets belonging to the flow "A" are allocated to the queue 27 corresponding to the ID "#o" of the processing unit 13.

If the flow of the received packets is allocated to any of the processing units 13 (YES in step S104), the sorting unit 25 adds the packets to the end of the corresponding queue 27 (step S105).

On the other hand, if the flow of the received packets is not allocated to any of the processing units 13 (NO in step S104), the sorting unit 25 checks whether there is an empty queue 27, and if there is no empty queue (NO in step S106), the packets are saved in the saved packet holding unit 26 (step S110).

On the other hand, if there is an empty queue 27 (YES in step S106) and if there is a packet already saved and held in the saved packet holding unit 26 (YES in step S107), the sorting unit 25 causes the received packets to be saved in the saved packet holding unit 26 (step S110).

On the other hand, if there is no packet that has already been saved and held in the saved packet holding unit 26 (NO in step S107), the control unit 23 updates the information of the allocation information table of the allocation information storage unit 24 (step S108).

More specifically, as the control unit 23 updates the information of the allocation information table, an allocated flow ID indicating the flow of the received packets and the ID of the processing unit corresponding to the empty queue 27 are stored in the allocation information storage unit 24 as allocation information of a new flow.

Then, the sorting unit 25 then sorts the packets into the empty queue 27 to which the new flow has been allocated. Then, the empty queue 27 temporarily stores the sorted packets (step S109).

Overview of Operation of Saved Packet Holding Unit

Next, an overview of an operation of the saved packet holding unit 26 will be described with reference to FIG. 5. As described above, the saved packet holding unit 26 has a function of storing received packets and a function of retrieving held packets. Based on these two different functions, the saved packet holding unit 26 operates in two operation modes which are "operation mode 1" and "operation mode 2."

Figure 5:
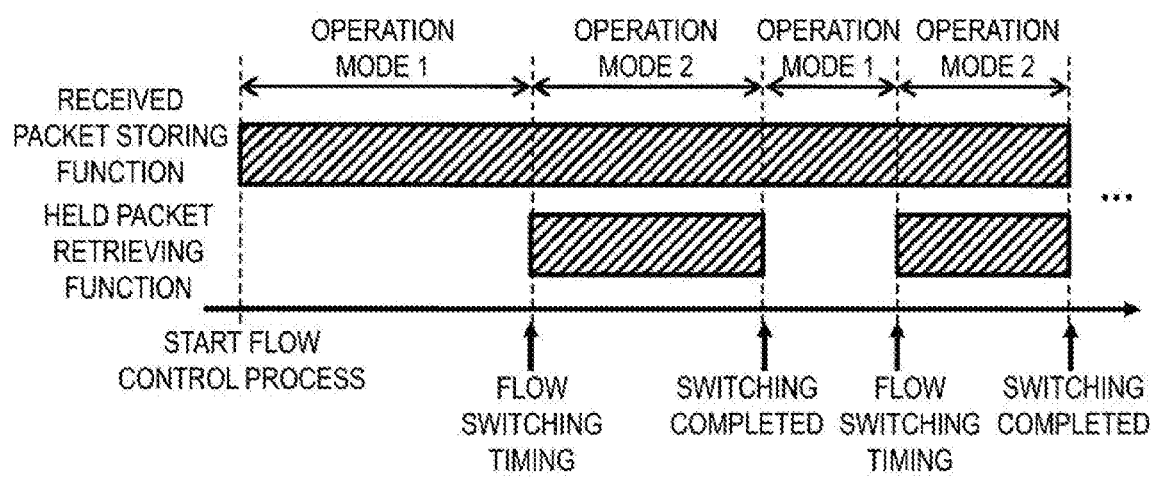
FIG. 5 is a diagram illustrating an example of an operation of the flow control device according to an embodiment of the present disclosure.

As illustrated in FIG. 5, the saved packet holding unit 26 operates in the "operation mode 1" in which only received packets are stored in a predetermined normal state from a start of flow control of the flow control device 12. The saved packet holding unit 26 switches to the "operation mode 2" in which both storage of received packets and retrieving of held packets are available at a timing at which a flow of packets is switched, which will be described below.

Then, when switching of the flow of packets is completed, the saved packet holding unit 26 switches to the "operation mode 1."

Flow Allocation Process

Figure 6A:
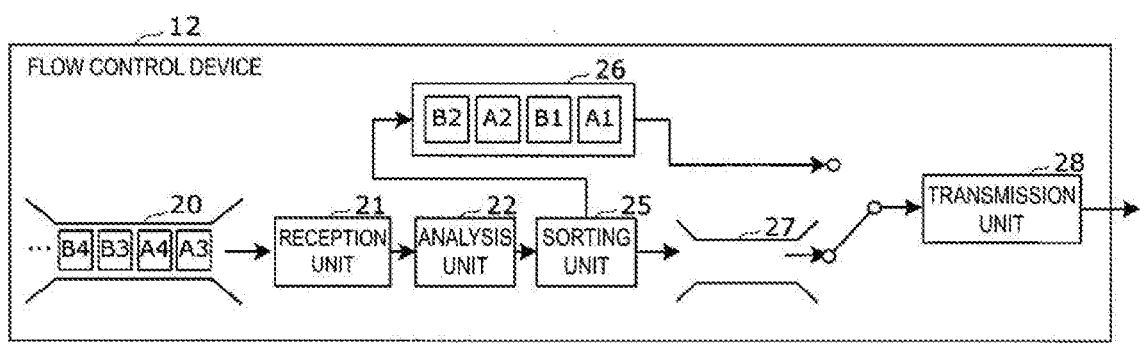
FIG. 6A is a diagram illustrating an example of an operation of the flow control device according to an embodiment of the present disclosure.
Figure 6B:
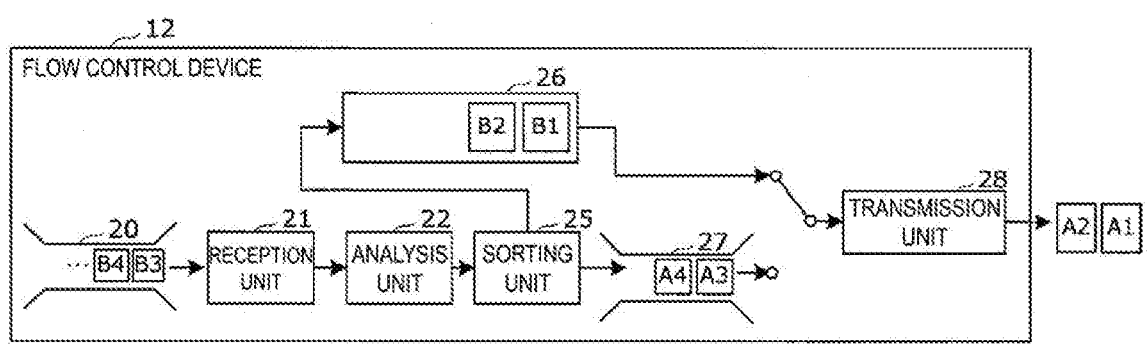
FIG. 6B is a diagram illustrating an operation of the flow control device according to an embodiment of the present disclosure.
Figure 6C:
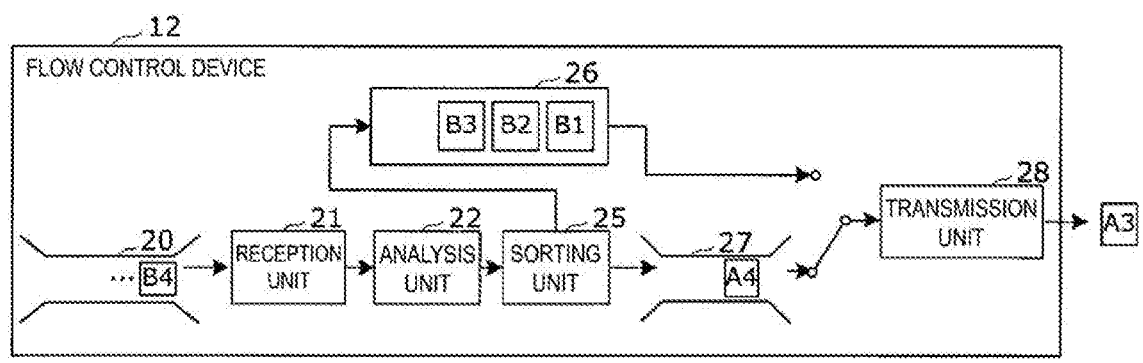
FIG. 6C is a diagram illustrating an example of an operation of the flow control device according to an embodiment of the present disclosure.

FIGS. 6A to 6C illustrate examples of operations of the entire flow control device 12 when a flow of packets already held in the saved packet holding unit 26 is allocated to a queue 27, particularly when an empty queue 27 occurs. Note that, in FIGS. 6A to 6C, the control unit 23 and the allocation information storage unit 24 are omitted.

As illustrated in the example of FIG. 6A, first, it is assumed that any of the plurality of queues 27 has become empty. At this timing, a flow to which a head packet of packets held by the saved packet holding unit 26 belongs is allocated to the empty queue 27. In other words, the flow "A" to which the head packet "A1" held by the saved packet holding unit 26 belongs is allocated to the empty queue 27 by the control unit 23. The control unit 23 can identify the flow of the head packet using, for example, the header information of the head packet.

Next, as illustrated in FIG. 6B, a destination of the transmission unit 28 for acquiring the packets corresponding to the empty queue 27 is changed to the saved packet holding unit 26. In this way, the transmission unit 28 acquires all of the packets "A1" and "A2" belonging to the flow "A" from the saved packet holding unit 26 and transmits the acquired packets to the corresponding processing unit 13.

Here, the packets "A3" and "A4" belonging to the flow "A" held in the input buffer 20 are sorted into the queue 27 for each processing unit 13 by the sorting unit 25. In parallel with the operation, the saved packet holding unit 26 stores the packets held in the input buffer 20.

More specifically, as illustrated in FIGS. 6B and 6C, the packets "B3" and "B4" belonging to a flow "B" held in the input buffer 20 are saved in the saved packet holding unit 26 by the sorting unit 25.

Thereafter, when the saved packet holding unit 26 ends retrieving all of the packets belonging to the flow "A," the control unit 23 changes the destination of the transmission unit 28 for acquiring packets from the saved packet holding unit 26 to the queue 27. Then, the packets "A3" and "A4" belonging to the flow "A" that are temporarily stored in the queue 27 are transmitted to the processing unit 13 by the transmission unit 28.

Configuration of Saved Packet Holding Unit

Figure 7:
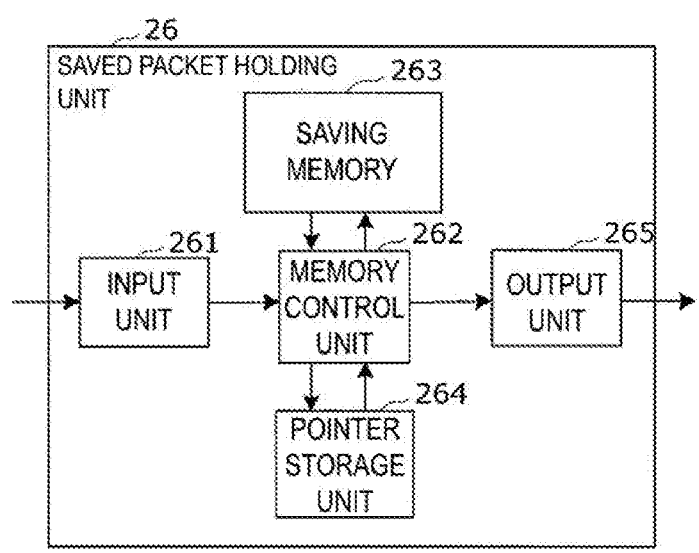
FIG. 7 is a block diagram illustrating a configuration of a saved packet processing unit according to an embodiment of the present disclosure.

Next, a configuration of the saved packet holding unit 26 will be described with reference to the block diagram of FIG. 7.

The saved packet holding unit 26 includes an input unit 261, a memory control unit 262, a saving memory 263, a pointer storage unit 264, and an output unit 265.

The input unit 261 accepts an input of a packet saved by the sorting unit 25.

The memory control unit 262 controls reading and writing of data from and into the saving memory 263.

The saving memory 263 stores saved packets input from the input unit 261. The saving memory 263 holds two linked lists including a packet list and an empty list, which will be described below. In addition, the saving memory 263 has a temporary packet list that temporarily holds packets to be saved. A non-volatile memory, for example, may be used as the saving memory 263.

The pointer storage unit 264 stores pointer information for identifying an address of the saving memory 263 used for managing the saving memory 263. Note that the pointers will be described in detail below.

The output unit 265 outputs a packet read by the memory control unit 262 from the saving memory 263 to the transmission unit 28.

Configuration of Saving Memory

Next, a configuration of the saving memory 263 will be described using FIGS. 8A and 8B.

Figure 8A:
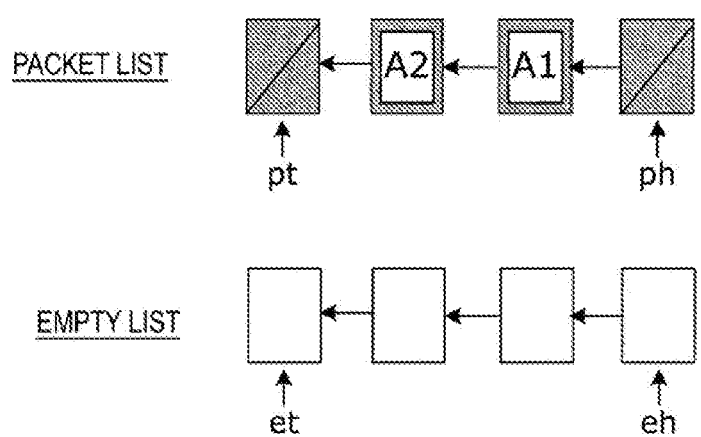
FIG. 8A is a diagram for describing a logical configuration of a saving memory according to an embodiment of the present disclosure.

As illustrated in FIG. 8A, a logical configuration of the saving memory 263 has two linked lists including a "packet list" for managing saved packets and an "empty list" for managing an empty area of the saving memory 263.

Figure 8B:
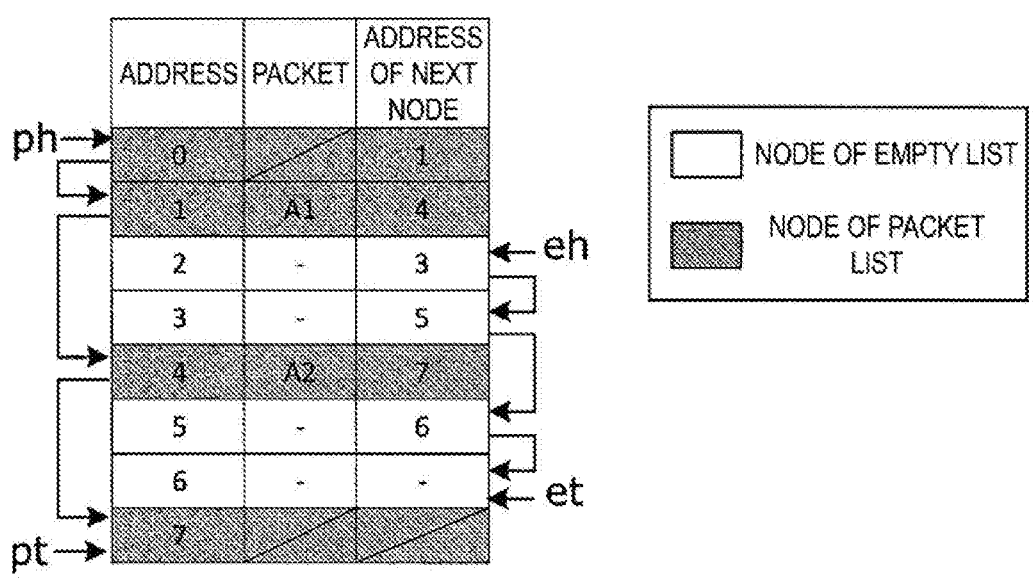
FIG. 8B is a diagram for describing a physical configuration of the saving memory according to an embodiment of the present disclosure.

FIG. 8B illustrates a physical configuration of the saving memory 263. An "address" of the saving memory 263 is used as a node identification number of the linked list illustrated in FIG. 8A. Each node holds information indicating an "address of the next node" in association with information indicating a "packet," and thereby a list structure of the saving memory 263 is realized. In FIGS. 8A and 8B, nodes of the packet list are nodes indicated in gray, and nodes of the empty list are indicated in white.

In addition, to distinguish the packet list from the empty list, pointers indicating a head node and a tail node of each list are provided. As illustrated in FIGS. 8A and 8B, the head node of the packet list is managed by a pointer ph and the tail node of the packet list is managed by a pointer pt. On the other hand, the head node of the empty list is managed by a pointer eh and the tail node of the empty list is managed by a pointer et.

Furthermore, in order to simplify a scanning process for the linked lists, the head node and the tail node of the packet list are treated as dummy nodes with no packet stored.

Operation Mode 1 of Saved Packet Holding Unit

Next, details of an operation of the saved packet holding unit 26 with the configuration described above will be described using the flowchart of FIG. 9. An overview of the operation of the saved packet holding unit 26 is as illustrated in FIG. 5. Here, the "operation mode 1" of the saved packet holding unit 26 will be described in detail.

Figure 9:
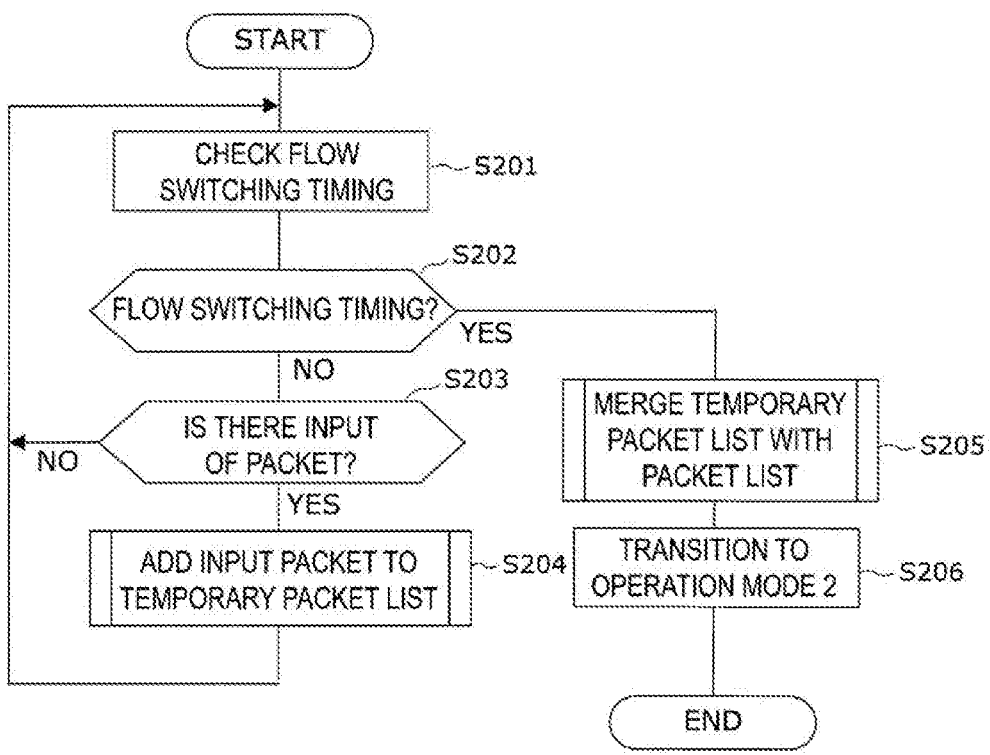
FIG. 9 is a flowchart for explaining an operation mode 1 of a saved packet holding unit according to an embodiment of the present disclosure.

FIG. 9 is a flowchart for explaining the operation mode 1 of the saved packet holding unit 26. In the operation mode 1, the saved packet holding unit 26 performs loop processing to repeat an input packet storage process, and then exits the loop to transition to the operation mode 2 at a time at which flow switching occurs. Note that the time of flow switching is a parameter specified in the stage of design.

Here, the necessity for flow switching will be described. A time taken for all packets belonging to the same flow to arrive at the data processing device 10, or the like via an external network varies depending on a type of packets, that is, a flow. For example, a time required for all packets included in a flow to arrive at the device varies depending on a difference in a congested state and a physical transfer rate of a network through which the flow passes. In addition, due to a difference in the number of packets included in the flow, or the like, a time taken for all packets belonging to the flow to be transferred varies.

Thus, if no flow is switched in the flow control device 12, a flow that needs a long time taken for all packets to arrive at the device occupies the processing unit 13 for a long period of time. While one flow occupies the processing unit 13, processing of another flow is made to wait and the processing delay increases.

As such a method of avoiding an increase in processing delay dependent on the time for all packets included in one flow to arrive at the device, a method of setting an upper limit on an occupation time with respect to the processing unit 13 and forcibly switching the flow to be processed even if processing of all of the packets included in the flow is not completed is conceivable.

In this way, a lowest value of the processing delay can be controlled with the "upper limit value of an exclusive time", in other words, a parameter called a "timing of flow switching." A method of fixing the timing of flow switching at the time of design and a method of providing the timing externally input during an operation of the flow control device 12 as a variable value are conceivable. Note that the value of the set parameter is stored in a predetermined area of the allocation information storage unit 24, for example.

Returning to FIG. 9, the operation mode 1 in the saved packet holding unit 26 will be described here. First, the control unit 23 of the flow control device 12 checks the flow switching timing on the basis of the "upper limit value of the exclusive time" in the processing unit 13, which is a parameter of the flow control described above (step S201).

In a case in which the control unit 23 determines that a time is not a flow switching timing (NO in step S202), if a packet is input to the input unit 261 of the saved packet holding unit 26 (YES in step S203), the memory control unit 262 adds the input packet to the temporary packet list of the saving memory 263 (step S204). Details of the packet addition process by the memory control unit 262 with respect to the temporary packet list of the saving memory 263 will be described below.

Note that, as illustrated in FIGS. 8A and 8B, in the saving memory 263, nodes storing packets are not sequentially added to the packet list, but are actually managed as a temporary packet list until a flow switching timing.

In a case in which the control unit 23 determines that a time is a flow switching timing (YES in step S202), the temporary packet list of the saving memory 263 is merged with the packet list (step S205). Then, the saved packet holding unit 26 transitions to the operation mode 2 (step S206). Note that the merge process of the linked list will be described in detail below.

Packet Addition Process with Respect to Temporary Packet List

Next, the packet addition process with respect to the temporary packet list (step S204) in the operation mode 1 illustrated in FIG. 9 will be described with reference to FIG. 10 and FIG. 11.

First, an example of an operation of the packet addition process by the memory control unit 262 with respect to the temporary packet list will be described.

Figure 10:
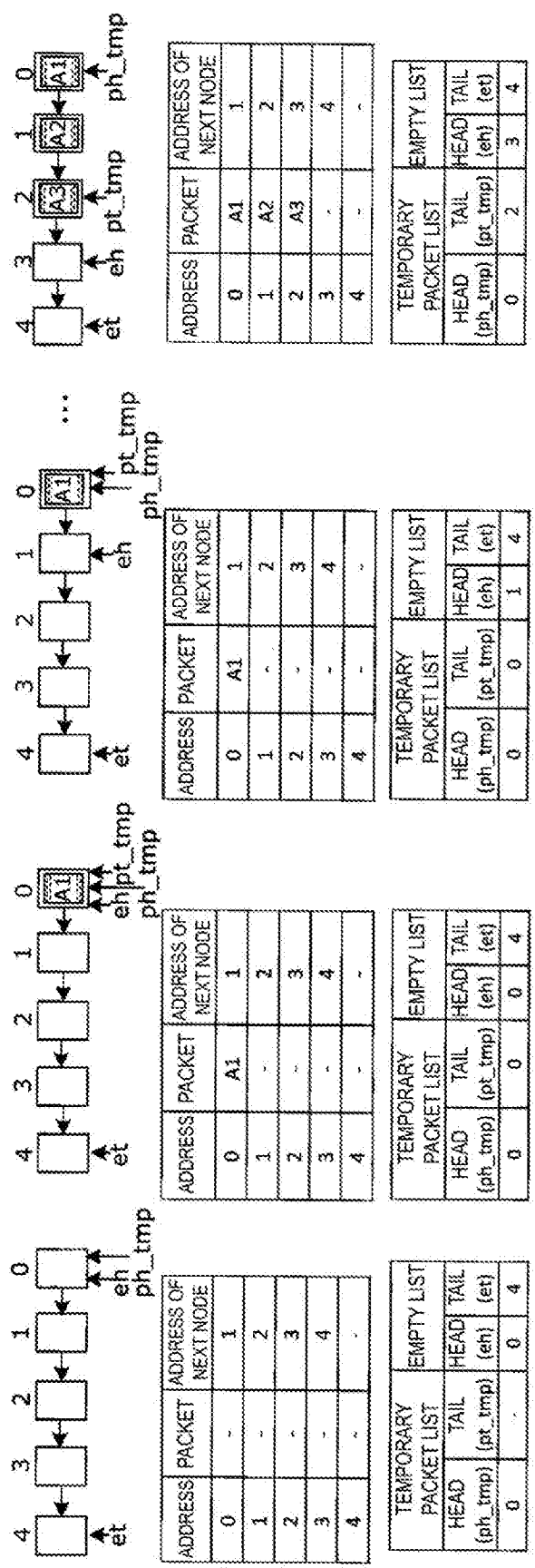
FIG. 10 is a diagram for describing an example of an operation of a packet addition process according to an embodiment of the present disclosure.

In the example illustrated in FIG. 10, a node 0 through a node 4 represent an empty list. Also, in the temporary packet list, the head node is managed using a pointer ph_tmp and the tail node is managed using a pointer pt_tmp.

As the temporary packet list progresses from the empty state, which is illustrated on the leftmost side of FIG. 10, to the right side, packets are gradually added to the temporary packet list. In the configuration of the saving memory 263 illustrated in FIG. 10, in the state on the leftmost side of FIG. 10, the pointer ph_tmp indicating the head node of the temporary packet list matches the pointer eh indicating the head node of the empty list.

Next, in the second state from the left of FIG. 10, the packet "A1" is stored in the head node of the empty list (the node indicated by the pointer eh). In the third state from the left, the pointer pt_tmp indicating the tail node of the temporary packet list is updated to the value of the pointer eh indicating the head node of the empty list. In this way, packets are added to the temporary packet list.

Next, in the state on the rightmost side of FIG. 10, packets "A2" and "A3" are likewise added to the temporary packet list. The pointer eh indicating the head node of the empty list indicates node 3, and the pointer ph_tmp indicating the head node of the temporary packet list indicates the node 0 to which the packet "A1" has been added. In addition, the pointer pt_tmp indicating the tail node of the temporary packet list indicates the node 2 to which the packet "A3" has been added.

In this manner, it can be seen that the nodes storing the new packets "A2" and "A3" are held as the temporary packet list.

Next, the packet addition process with respect to the temporary packet list described in FIG. 10 will be described further using the flowchart of FIG. 11.

First, if the pointer eh indicating the head node of the empty list matches the pointer et indicating the tail node thereof in the saving memory 263 (YES in step S301), the memory control unit 262 causes the process to return to step S201 of FIG. 9 (checking of a flow switching timing).

On the other hand, if the pointer eh does not match the pointer et of the empty list (NO in step S301), the memory control unit 262 retrieves the packet from the input unit 11 (step S302).

Next, the memory control unit 262 then stores the retrieved packet in the node at the address on the empty list indicated by the pointer eh (step S303). Thereafter, the memory control unit 262 updates the pointer pt_tpm indicating the tail node of the temporary packet list to the pointer eh indicating the head node of the empty list (step S304).

Next, the memory control unit 262 updates the pointer eh currently indicating the head node of the empty list so as to indicate the next node (eh→next) (step S305).

Packets are added to the temporary packet list following the above procedure.

Merge Process

Figure 12:
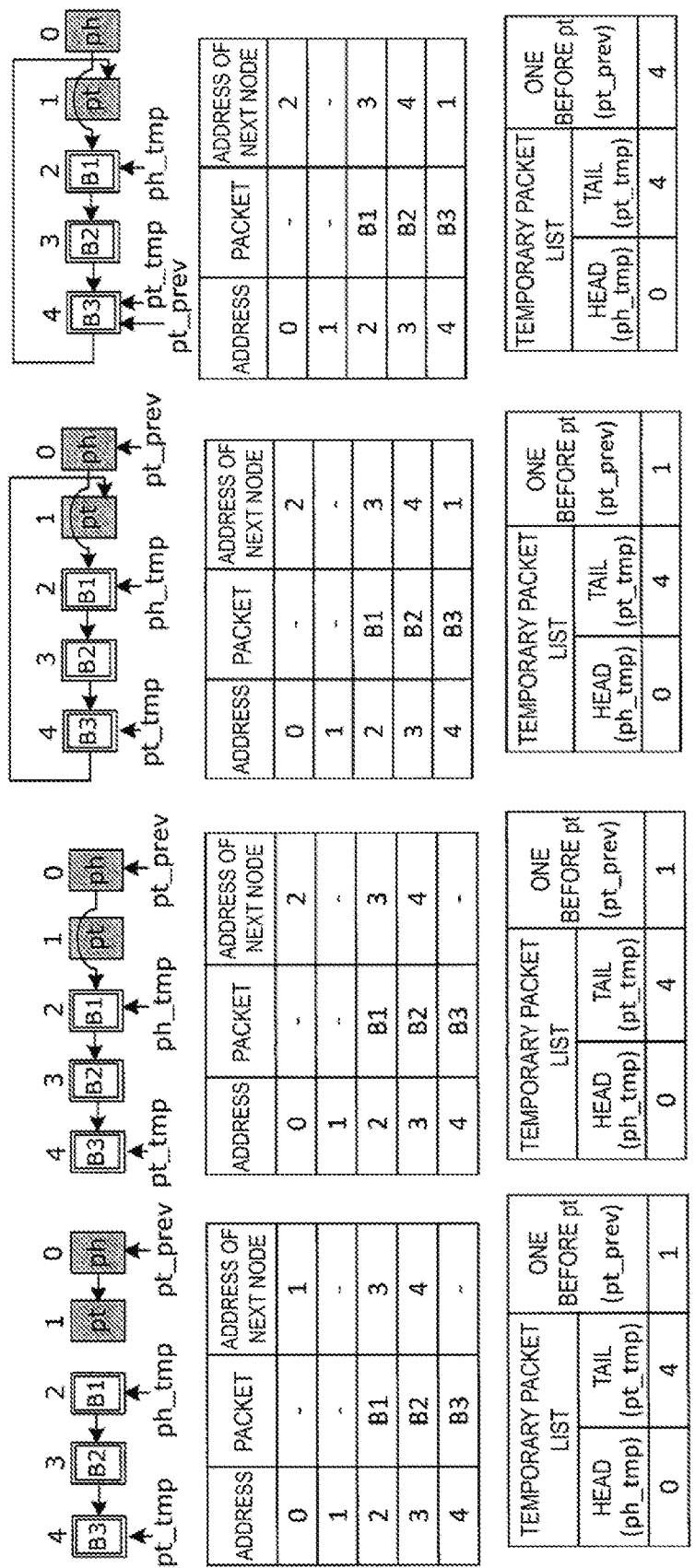
FIG. 12 is a diagram for describing an example of an operation of a merge process according to an embodiment of the present disclosure.
Figure 13:
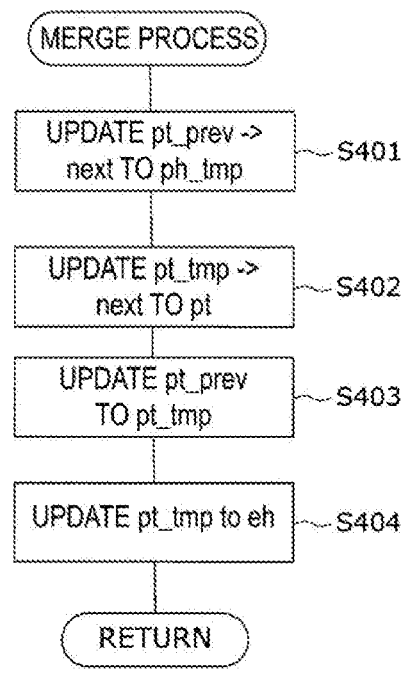
FIG. 13 is a flowchart for describing the merge process according to an embodiment of the present disclosure.

Next, a process (step 205) of merging the temporary packet list with the packet list when a flow switch timing comes, illustrated in FIG. 9, will be described with reference to FIG. 12 and FIG. 13. FIG. 12 illustrates an example of an operation of the merge process performed by the memory control unit 262. In the example of the operation illustrated in FIG. 12, a node 0 through a node 1 represent a packet list, and a node 2 through a node 4 represent a temporary packet list.

In addition, in the packet list, a pointer ph indicates the head node, and the pointer pt indicates the tail node. Further, a pointer pt_prev is a pointer indicating the node immediately before the tail node indicated by a pointer pt on the packet list. Note that "immediately before" indicates a sequential relation in a logical list structure in the saving memory 263, rather than a sequential relation of physical addresses.

In addition, although a case in which the packet list is empty is assumed in the example illustrated in FIG. 12, the merge process can be performed in the same process even when the packet list is not empty.

In the logical configuration of the saving memory 263 illustrated in FIG. 12, the nodes in gray are nodes of the packet list, and the nodes in white are nodes of the temporary packet list. First, as illustrated in the configuration of the saving memory 263 on the leftmost side of FIG. 12, the temporary packet list stores packets "B1," "B2," and "B3" in the node 2 to the node 4. The node 2 storing the packet "B1" is the head node of the temporary packet list, and the node 4 storing the packet "B3" is the tail node.

Next, as illustrated in the second state from the left of FIG. 12, the memory control unit 262 updates the next node in the direction of the arrow from the node (node 0) indicated by the pointer pt_prev to the node (node 2) indicated by the pointer ph_tmp indicating the head node of the temporary packet list.

Next, as illustrated in the third state from the left of FIG. 12, the memory control unit 262 updates the node next to the node (node 4) indicated by the pointer pt_tmp of the temporary packet list to the tail node (node 1 indicated by the pointer pt) of the packet list.

Further, as illustrated in the state on the rightmost side of FIG. 12, the memory control unit 262 updates the pointer pt_prev to the pointer pt_tmp. Finally, the memory control unit 262 updates the pointer ph_tmp indicating the head node of the temporary packet list to the pointer eh indicating the head node of the empty list. The merge process of the memory control unit 262 ends in the above-described manner.

Next, the merge process illustrated in FIG. 12 will be further described with reference to the flowchart of FIG. 13.

First, the memory control unit 262 updates the node next to the node indicated by the pointer pt_prev (pt_prev→next) so as to be the node indicated by the pointer ph_tmp in the saving memory 263 (step S401).

Next, the memory control unit 262 updates the node next to the node indicated by the pointer pt_tmp (pt_tmp→next) to the node indicated by the pointer pt, which is the tail node of the packet list (step S402).

Next, the memory control unit 262 updates the pointer pt_prev to the pointer pt_tmp (step S403). Thereafter, the memory control unit 262 updates the pointer ph_tmp to the pointer eh (step S404) and causes the process to return to the operation mode 2 (step S206 in FIG. 9).

Operation Mode 2 of Saved Packet Holding Unit

Next, the operation mode 2 of the saved packet holding unit 26 will be described with reference to the flowchart of FIG. 14.

A basic operation in the operation mode 2 is a loop process in which the saved packet holding unit 26 scans the packet list from the head node to the tail node and retrieves packets matching a flow to be retrieved. If a packet is input in the middle of the scanning process performed by the saved packet holding unit 26, the input packet is added to the temporary packet list of the saving memory 263. Note that, a pointer "sp" represents a scanning pointer below.

Figure 14:
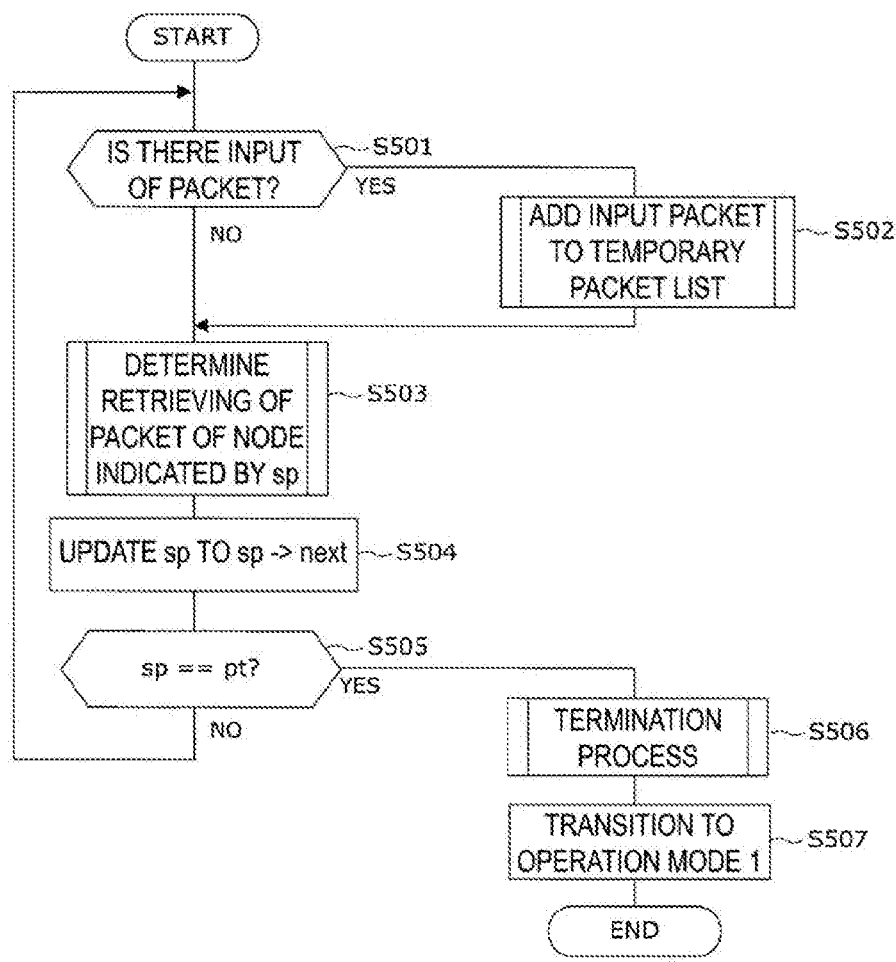
FIG. 14 is a flowchart for describing an operation mode 2 of the saved packet holding unit according to an embodiment of the present disclosure.

As illustrated in FIG. 14, first, if a packet is input to the input unit 261 (YES in step S501), the memory control unit 262 adds the input packet to the temporary packet list of the saving memory 263 (step S502).

Figure 11:
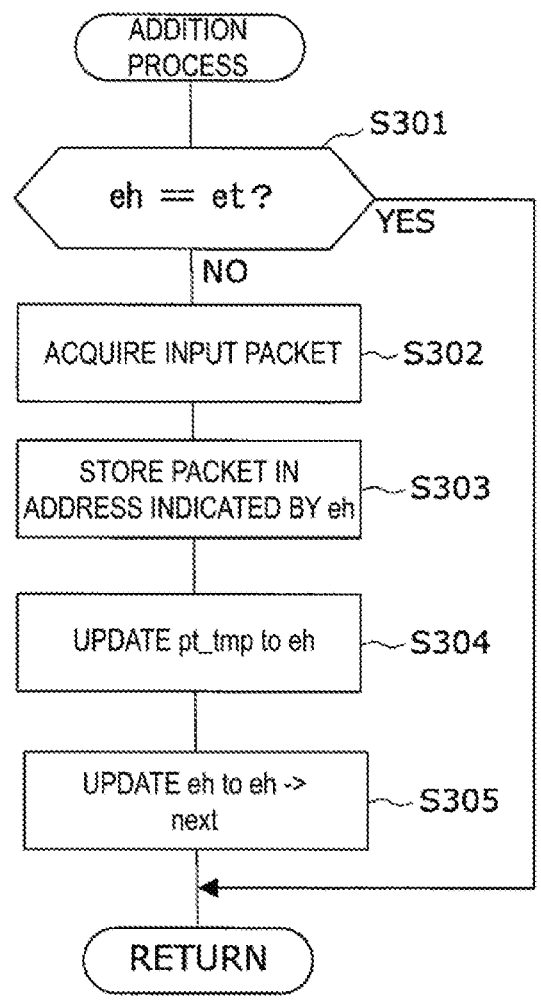
FIG. 11 is a flowchart for describing the packet addition process according to an embodiment of the present disclosure.

The packet addition process with respect to the temporary packet list performed in step S502 is performed in a similar procedure to that of the packet addition processing with respect to the temporary packet list in the operation mode 1 (step S204 in FIG. 9, FIG. 10 and FIG. 11).

On the other hand, if no packet is input to the input unit 261 (NO in step S501), the memory control unit 262 determines whether the packet of the node indicated by the scanning pointer sp is the packet to be retrieved (step S503). In addition, after the packet is added to the temporary packet list in step S502, the process transitions to step S503. Note that details of the determination process of step S503 will be described below.

After the determination process of step S503, the memory control unit 262 updates the scanning pointer sp so as to indicate the node next to the node currently indicated (sp→next) (step S504).

Next, if the scanning pointer sp matches the pointer pt indicating the tail node of the packet list (YES in step S505), the memory control unit 262 performs a termination process (step S506). Thereafter, the memory control unit 262 causes the process to transition to the operation mode 1 (step S507). Note that details of the termination process will be described below.

Retrieving Determination Process

Next, the retrieving determination process illustrated in FIG. 14 (step S503) will be described with reference to the flowchart of FIG. 15.

First, if the flow of packets of the node indicated by the scanning pointer sp does not match the flow to be retrieved (NO in step S601), the memory control unit 262 updates the pointer sp_prev indicating the node immediately before the node indicated by the scanning pointer sp so as to indicate the node next to the node currently indicated (step S602). Then, the process returns to the step of updating the scanning pointer sp illustrated in FIG. 14 (step S504 in FIG. 14).

Note that the pointer sp_prev is a pointer indicating the node immediately before the node indicated by the scanning pointer sp at all times. Note that "immediately before" indicates a sequential relation in a logical list structure in the saving memory 263, rather than a sequential relation of physical addresses.

On the other hand, if the flow of packets of the node indicated by the scanning pointer sp matches the flow to be retrieved (YES in step S601), the memory control unit 262 retrieves the packet of the node indicated by the scanning pointer sp and transmits the packet to the transmission unit 28 via the output unit 265 (step S603).

Next, the memory control unit 262 then updates the node next to the node indicated by the pointer et (et→next) so as to be the node indicating the scanning pointer sp (step S604). Thereafter, the memory control unit 262 updates the pointer et to the scanning pointer sp (step S605).

Finally, the memory control unit 262 updates the node next to the node indicated by the pointer sp_prev (sp_prev→next) so as to indicate the node next to the node indicated by the scanning pointer sp (sp→next) (step S606). With the procedure described above, the retrieving determination process ends and the process returns to step S504 (FIG. 14) in the operation mode 2.

Here, an example of an operation of the memory control unit 262 in the case in which the flow of packets of the node indicated by the scanning pointer sp matches the flow to be retrieved (YES in step S601) in the above-described retrieving determination process will be described using FIGS. 16A to 16E.

In the example of the operation illustrated in FIGS. 16A to 16E, nodes 0 through 3 represent a packet list, and a node 4 represents an empty list. In addition, a flow "A" of packets is assumed to be retrieved by the memory control unit 262 below.

Figure 15:
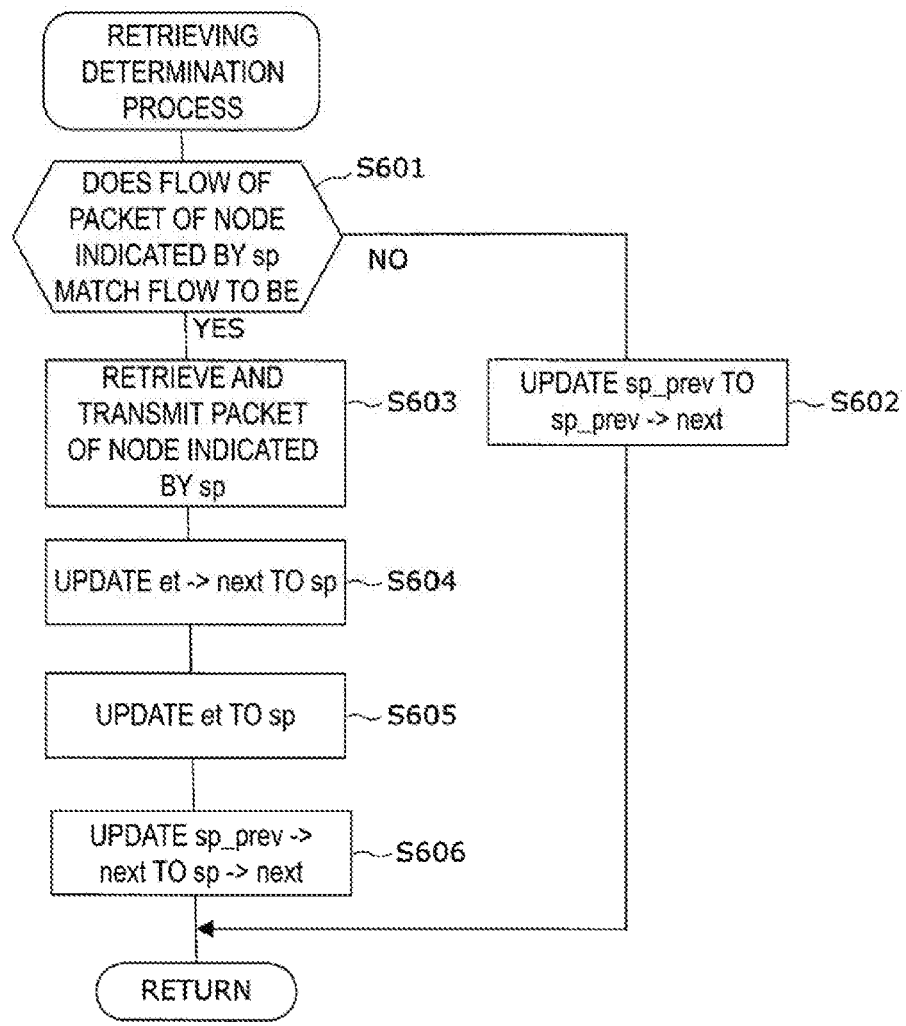
FIG. 15 is a flowchart for describing a packet retrieving determination process according to an embodiment of the present disclosure.
Figure 16A:
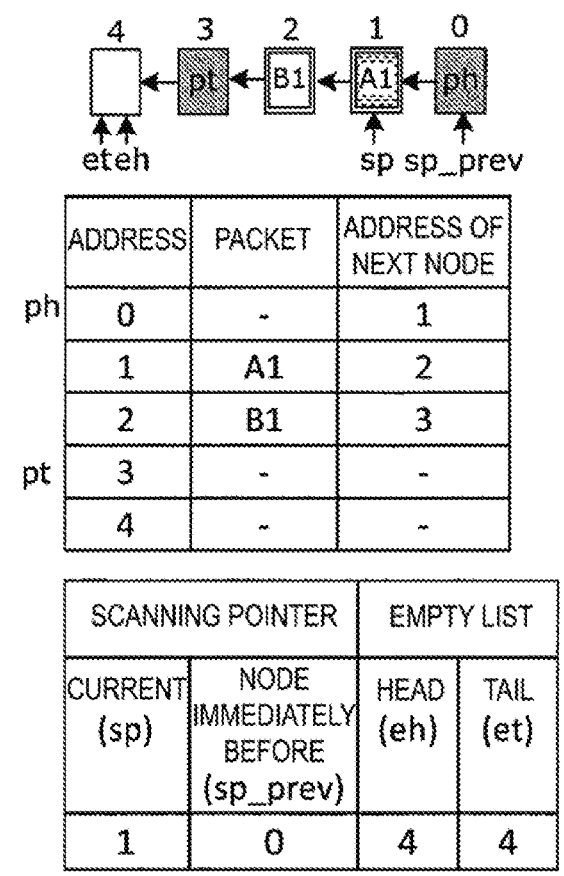
FIG. 16A is a diagram illustrating an example of an operation of the packet retrieving determination process according to an embodiment of the present disclosure.

First, as illustrated in FIG. 16A, the memory control unit 262 checks that the flow to which the packet "A1" of the node 1 indicated by the scanning pointer sp belongs matches the flow "A" to be retrieved (step S601 in FIG. 15).

Figure 16B:
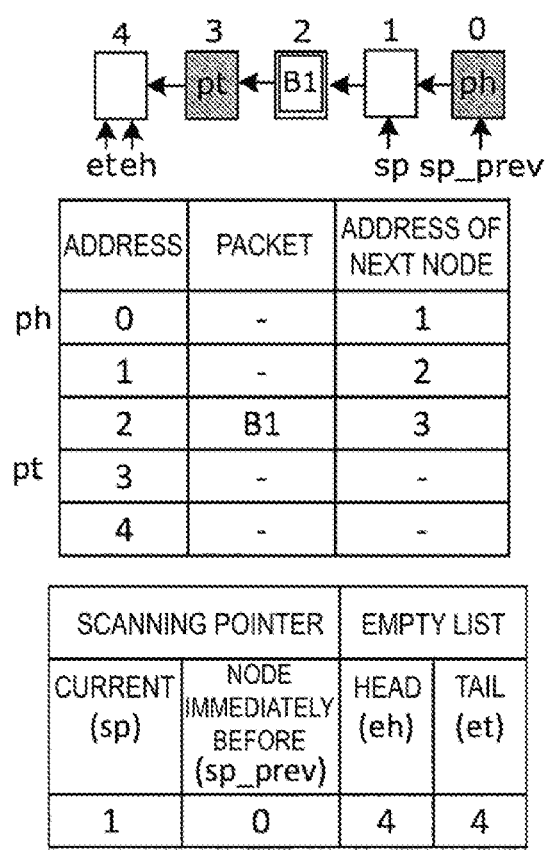
FIG. 16B is a diagram illustrating an example of an operation of the packet retrieving determination process according to an embodiment of the present disclosure.

Next, as illustrated in FIG. 16B, the memory control unit 262 retrieves the packet "A1" of the node 1 and transmits the packet to the transmission unit 28 via the output unit 265 (step S603 in FIG. 15).

Figure 16C:
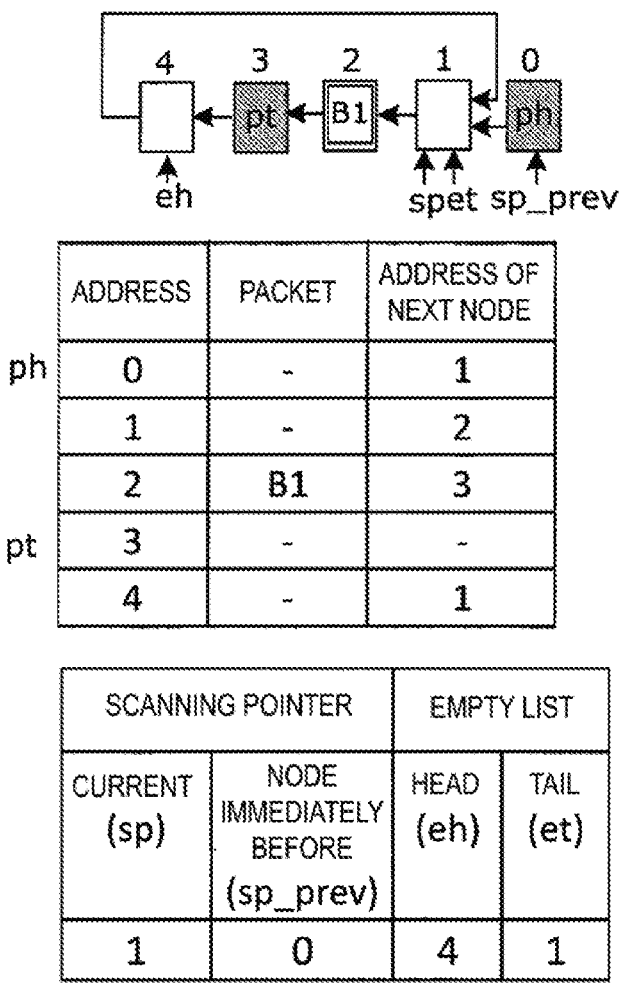
FIG. 16C is a diagram illustrating an example of an operation of the packet retrieving determination process according to an embodiment of the present disclosure.

Next, as illustrated in FIG. 16C, the memory control unit 262 then updates the node next to the node (node 4) indicated by the pointer eh to the node (node 1) indicated by the scanning pointer sp (step S604 in FIG. 15). In addition, the memory control unit 262 updates the pointer et to the node (node 1) indicated by the scanning pointer sp (step S605 in FIG. 15).

As a result, the value of the "address of the next node" of the address "4" is "1" and the value of the "end (pointer et) of the empty list" is updated to "1" as illustrated in FIG. 16C.

Figure 16D:
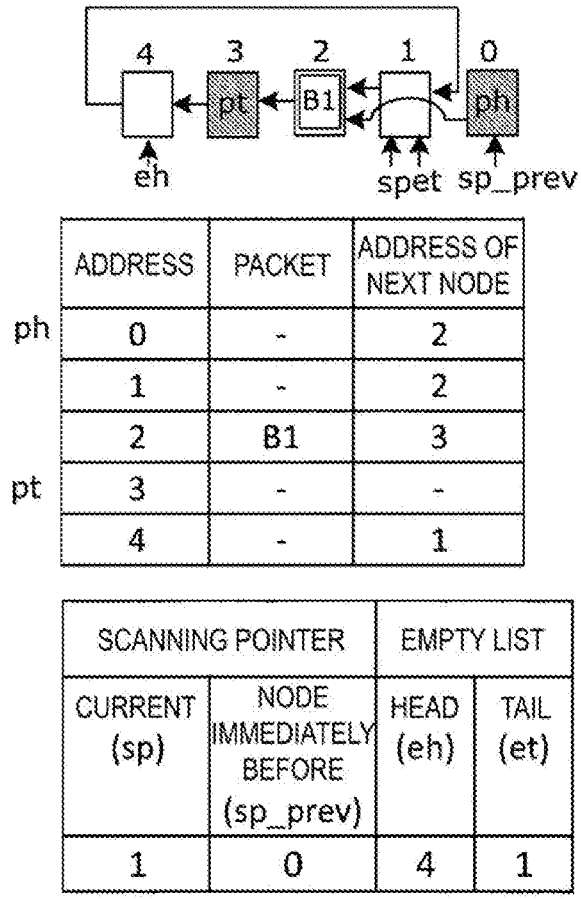
FIG. 16D is a diagram illustrating an example of an operation of the packet retrieving determination process according to an embodiment of the present disclosure.

Next, as illustrated in FIG. 16D, the memory control unit 262 updates the node next to the node (node 0) indicated by the pointer sp_prev to the node (node 2) next to the node (node 1) indicated by the scanning pointer sp (step S606 in FIG. 15).

Figure 16E:
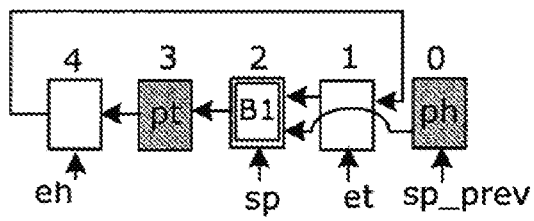
FIG. 16E is a diagram illustrating an example of an operation of the packet retrieving determination process according to an embodiment of the present disclosure.

Finally, as illustrated in FIG. 16E, the memory control unit 262 updates the node (node 1) indicated by the scanning pointer sp to the next node (node 2) (step S504 in FIG. 14). With the procedure described above, the packet retrieving process is performed by the memory control unit 262.

On the other hand, an example of an operation of the memory control unit 262 in the case in which the flow of packets of the node indicated by the scanning pointer sp does not match the flow to be retrieved (NO in step S601) in the above-described retrieving determination process will be described below using FIG. 17.

A case in which the memory control unit 262 retrieves packets of the flow "A" will be considered as in FIGS. 16A to 16E described above.

Figure 17:
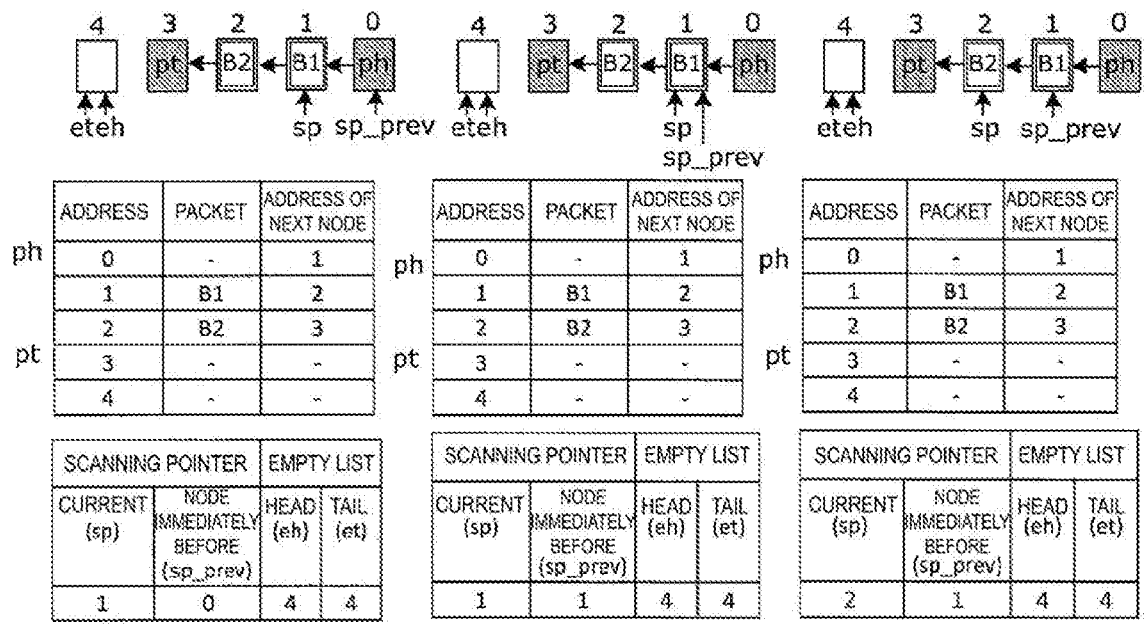
FIG. 17 is a diagram illustrating an example of an operation of the packet retrieving determination process according to an embodiment of the present disclosure.

As illustrated in the configuration of the saving memory 263 on the leftmost side of FIG. 17, a packet "B1" is stored in the node (node 1) indicated by the scanning pointer sp. A flow "B" to which the packet "B1" belongs does not match the flow "A" to be retrieved by the memory control unit 262.

In this case, as illustrated in the second state from the left of FIG. 17, the memory control unit 262 does not retrieve the packet "B1" and updates the node (node 0) indicated by the pointer sp_prev to the next node (node 1) (step S602 in FIG. 15).

In addition, as illustrated in the state on the rightmost side of FIG. 17, the memory control unit 262 updates the node (node 1) indicated by the scanning pointer sp to the next node (node 2) (step S504 in FIG. 14). This is an example of the operation of the memory control unit 262 in a case in which the flow of packets of the node indicated by the scanning pointer sp does not match the flow to be retrieved.

Termination Process

Next, the termination process (step S506) described in FIG. 14 will be described in detail with reference to FIG. 18 and FIG. 19. In the termination process, the memory control unit 262 returns the values of the scanning pointer sp and the pointer sp_prev immediately before the scanning pointer to an initial state. In addition, if the packet of the node immediately before the tail node of the packet list (node indicated by the pointer pt) is retrieved, the pointer pt_prev does not have a correct value. As such, the value of the pointer pt_prev is modified as the termination process.

First, an example of an operation of the termination process by the memory control unit 262 illustrated in FIG. 18 will be described. Note that, in the example illustrated in FIG. 18, nodes 0 through 3 represent a packet list.

Figure 18:
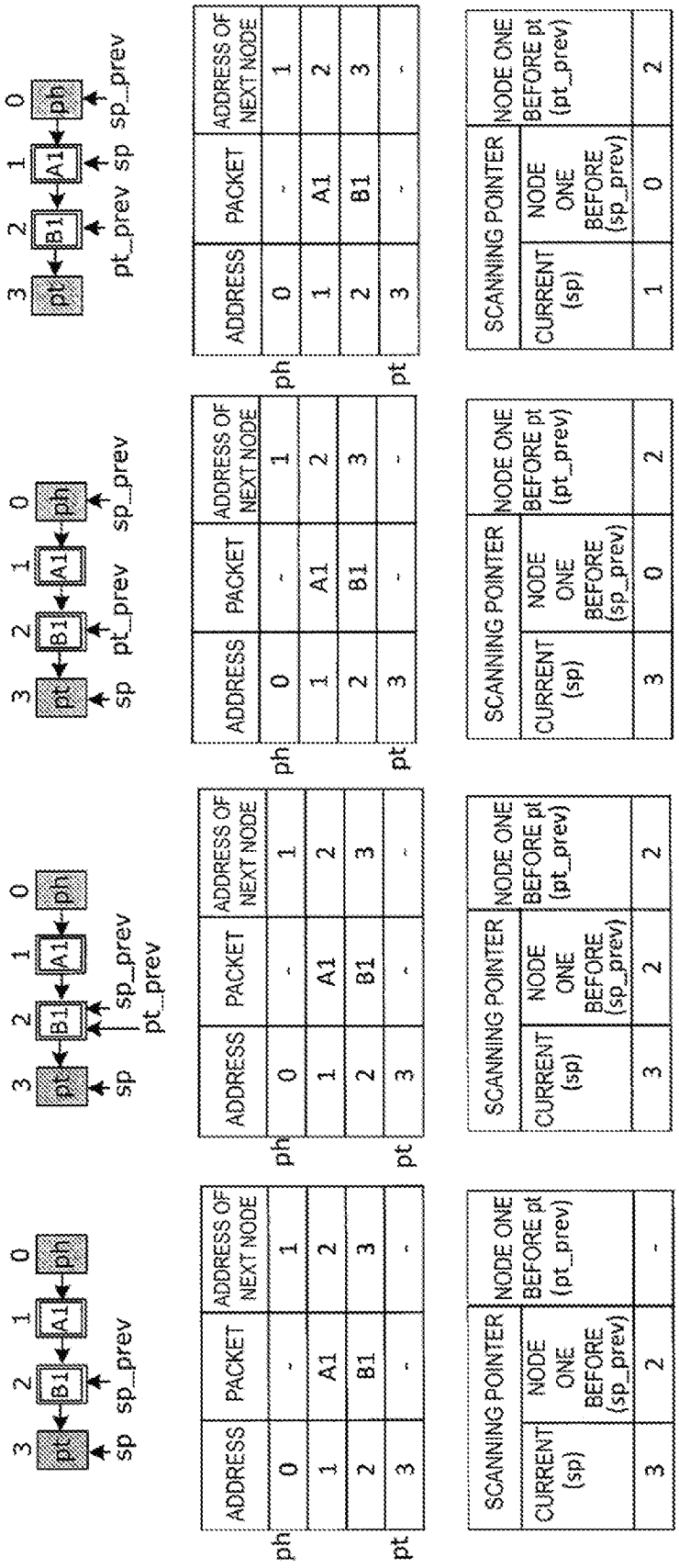
FIG. 18 is a diagram illustrating an example of an operation of a termination process according to an embodiment of the present disclosure.
Figure 19:
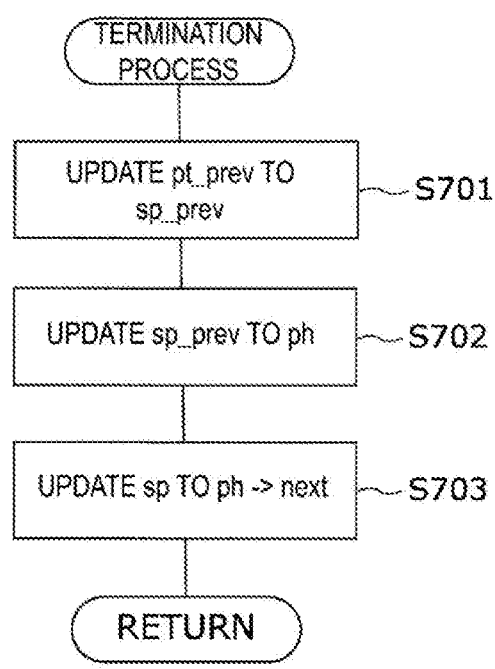
FIG. 19 is a flowchart for explaining the termination process according to an embodiment of the present disclosure.

As illustrated in the configuration of the saving memory 263 illustrated on the leftmost side of FIG. 18, the node (node 3) indicated by the scanning pointer sp matches the node indicated by the pointer pt at the end of the packet list.

Next, as illustrated in the second state from the left of FIG. 18, the memory control unit 262 updates the pointer pt_prev to the value of the pointer sp_prev (packet "B1" in the node 2,) immediately before the scanning pointer sp.

Next, as illustrated in the third state from the left of FIG. 18, the memory control unit 262 updates the pointer sp_prev to the pointer ph indicating the start of the packet list (node 0).

Thereafter, as illustrated in the state on the rightmost side of FIG. 18, the memory control unit 262 updates the node (node 3) indicated by the scanning pointer sp so as to indicate the next node (node 1) of the leading pointer ph in the packet list.

As described above, the memory control unit 262 executes the termination process and returns the values of the scanning pointer sp and the pointer sp_prev immediately before the scanning pointer sp to the initial state.

Next, the termination process will be described using the flowchart of FIG. 19.

First, the memory control unit 262 updates the pointer pt_prev to the pointer sp_prev (step S701).

Next, the memory control unit 262 updates the pointer sp_prev to the pointer ph (step S702). Next, the memory control unit 262 updates the scanning pointer sp so as to indicate the node next to the node indicated by the pointer ph (sp→next) (step S703). The termination process ends in accordance with the above procedure, and the process transitions from the operation mode 2 to the operation mode 1 (step S507 in FIG. 14).

In this manner, when the memory control unit 262 uses the scanning pointer sp and completes the scanning to the tail node, the process transitions to the operation mode 1 after the termination process.

According to the present embodiment, in a case in which there is no queue 27 to which received packets can be sorted, the saved packet holding unit 26 saves and stores packets, retrieves only packets of a predetermined flow from the held packets in the input order of the packets, and transmits the packets to the transmission unit 28 in the subsequent stage as described above. Thus, even in a case in which a packet belonging to a new flow is input with no empty queue 27 present, it is possible to avoid stalling of the input of subsequent packets and improve the use efficiency of the processing units arranged in parallel.

In addition, it is possible to prevent fragmentation of the memory holding packets and to further reduce the consumption of memory resources.

Although embodiments of the flow control device and method of the present disclosure have been described above the present disclosure is not limited to the described embodiments, and various types of modification that can be conceived by a person skilled in the art can be made within the scope of the disclosure described in the claims.

The flow control device and the processing units described in the embodiments of the present disclosure can be realized by a general purpose processor, a field programmable gate array (FPGA), an application specific integrated circuit (ASIC), and other programmable logic device, a discrete gate or transistor logic, a discrete hardware component, or a combination of any foregoing elements designed to achieve the functions described above.

In addition, the processing units of the present disclosure can also be realized by a general purpose processor executing a process in accordance with a program stored in a storage device.

REFERENCE SIGNS LIST

10 Data processing device
11 Input unit
12 Flow control device
13 Processing unit
14 Output unit
20 Input buffer
21 Reception unit
22 Analysis unit
23 Control unit
24 Allocation information storage unit
25 Sorting unit
26 Saved packet holding unit
27 Queue
28 Transmission unit
261 Input unit
262 Memory control unit
263 Saving memory
264 Pointer storage unit
265 Output unit.

The invention claimed is:

1. A device comprising:
a receiver configured to receive a first packet;
a memory queue configured to temporarily store a plurality of packets in a plurality of queues, the plurality of packets being sorted in the plurality of queues according to a respective flow identified for each of the plurality of packets;
one or more processors;
a non-transitory computer-readable storage medium storing a program to be executed by the one or more processors, the program including instructions to:
identify a first flow of the first packet;
store allocation information regarding a respective queue of the plurality of queues allocated to each of a plurality of flows, the plurality of flows corresponding to the plurality of packets;
select a storage destination for the first packet and sort the first packet according to the first flow identified for the first packet and the allocation information, wherein selecting the storage destination of the first packet comprises:
in response to determining that the first flow has no queue allocated as the storage destination of the first packet, saving, in a saved packet holder, the first packet belonging to the first flow, wherein the saved packet holder comprises:
an input configured to receive the first packet;
a memory configured to store the first packet; and
a pointer storage configured to hold pointer information to manage the memory; and
a transmitter configured to transmit the plurality of packets temporarily stored in the plurality of queues and packet saved in the saved packet holder to the one or more processors that processes the plurality of packets and the first packet.

2. The device according to claim 1, wherein the instructions include further instructions to:
in response to determining a first queue of the plurality of queues with no packet stored and determining a second packet is saved in the saved packet holder, decide a flow of a head packet of the second packet to be a predetermined flow, and allocate the predetermined flow to the first queue, wherein the transmitter acquires all packets belonging to the predetermined flow from the saved packet holder and transmits all the packets belonging to the predetermined flow to the one or more processors; and
sort, out of packets received by the receiver, a third packet belonging to the predetermined flow into the first queue.

3. The device according to claim 1, wherein the saved packet holder further comprises:
a memory controller configured to control reading and writing of data to and from the memory; and
an output configured to output the first packet stored in the memory to the transmitter.

4. The device according to claim 3, wherein the memory holds an area in which the first packet is stored as a first linked list and an empty area of the memory as a second linked list.

5. The device according to claim 4, wherein:
the memory controller stores one or more packets sequentially from a head node of the second linked list toward a tail node of the second linked list; and
the memory adds a node in which the one or more packets is stored to a tail node of the first linked list and retrieves, in parallel, a third packet belonging to a predetermined flow serving as a flow of a head packet of the one or more packets sequentially from a head node of the first linked list toward a tail node of the first linked list, and adds the third packet to the tail node of the second linked list.

6. The device according to claim 5, wherein the pointer storage stores:

an address of the head node of the second linked list, an address of the tail node of the second linked list, an address of the head node of the first linked list, and an address of the tail node of the first linked list; and a scanning pointer for when the memory controller retrieves the third packet belonging to the predetermined flow.

7. A method comprising:

receiving, by a device, a first packet and a second packet;

identifying, by the device, a first flow of the first packet;

deciding, by the device, among a plurality of queues temporarily storing a plurality of packets, a first queue to be a storage destination of the first packet according to the first flow identified for the first packet and according to allocation information regarding a respective queue of the plurality of queues allocated to each of a plurality of flows, the plurality of packets being sorted in the plurality of queues according to a respective flow identified for each of the plurality of packets, and the plurality of flows corresponding to the plurality of packets;

storing, by the device, the first packet the first queue;

in response to determining that a second flow of the second packet has no queue allocated as the storage destination of the second packet, saving, by the device in a first linked list of a saved packet holder, the second packet belonging to the second flow, wherein the saved packet holder comprises a pointer storage configured to hold pointer information to manage the first linked list; and transmitting, by the device, the first packet temporarily stored in the plurality of queues and the second packet saved in the saved packet holder to one or more processors to process the first packet and the second packet.

8. The method according to claim 7, further comprising:

in response to determining a second queue of the plurality of queues with no packet stored and determining a third packet is saved in the saved packet holder, deciding a flow of a head packet of the third packet to be a predetermined flow, and allocate the predetermined flow to the second queue, wherein all packets belonging to the predetermined flow from the saved packet holder and transmitted to the one or more processors; and sorting, out of packets received by the receiver, a fourth packet belonging to the predetermined flow into the second queue.

9. The method according to claim 7, wherein the saved packet holder further comprises:

an input configured to receive the first packet;

a memory configured to store the first packet, wherein the pointer information manages the memory;

a memory controller configured to control reading and writing of data to and from the memory, wherein the memory holds an area in which the second packet is stored as the first linked list; and an output configured to output the first packet stored in the memory to a transmitter of the device.

10. The method according to claim 9, wherein the memory holds an empty area of the memory as a second linked list.

\* \* \* \* \*